United States Patent Office 3,274,223
Patented Sept. 20, 1966

---

3,274,223
ORGANO-TITANIUM-ALUMINUM COMPOUNDS
Darrell C. Feay, Berkeley, Calif., assignor to The Dow Chemical Company, Midland, Mich., a corporation of Delaware
No Drawing. Filed Aug. 8, 1962, Ser. No. 215,529
10 Claims. (Cl. 260—429.5)

This invention relates to new and useful compositions of matter in complex organo-titanium-aluminum compounds. More particularly it pertains to a class of organometal compounds containing tetravalent titanium and aluminum, having the general formula $$(cp)_2Ti[CH_2Al(CH_3)X]_2$$

wherein cp is a cyclopentadienyl moiety selected from the class of cyclopentadienyl and alkylcyclopentadienyl radicals and X is selected from the class of halogen and lower alkoxy radicals, and to a method for making the same, which are the objects of this invention.

Specific compounds contemplated by the invention in the foregoing class are illustrated by the compound having the formula $$(C_5H_5)_2Ti[CH_2Al(CH_3)Cl]_2$$

wherein $C_5H_5$ is the cyclopentadienyl radical and by other compounds (referring to the formula just given) wherein the cyclopentadienyl radicals are replaced by alkylcyclopentadienyl radicals and/or the chlorine atoms are replaced by fluorine, bromine, iodine, methoxy, ethoxy, propoxy, butoxy, hexyloxy and other lower alkoxy radicals. Alkylcyclopentadienyl groups include methylcyclopentadienyl, ethylcyclopentadienyl, propylcyclopentadienyl, butylcyclopentadienyl, hexycyclopentadienyl, octylcyclopentadienyl and the like groups. While systematic nomenclature of the new compounds has not been developed, the specific compound $(C_5H_5)_2Ti[CH_2Al(CH_3)Cl]_2$ may be named bis(cyclopentadienyl)bis(methyl, chloroaluminylmethyl)-titanium, and other compounds of the new class may similarly be named from their specific formulae, such as $$(CH_3-C_5H_4)_2Ti[CH_2Al(CH_3)Cl]_2$$
$$(C_2H_5-C_5H_4)_2Ti[CH_2Al(CH_3)Cl]_2$$
$$(C_5H_5)_2Ti[CH_2Al(CH_3)F]_2$$
$$(C_5H_5)_2Ti[CH_2Al(CH_3)Br]_2$$
$$(C_5H_5)_2Ti[CH_2Al(CH_3)I]_2$$
$$(C_5H_5)_2Ti[CH_2Al(CH_3)(OCH_3)]_2$$
$$(C_5H_5)_2Ti[CH_2Al(CH_3)(OC_2H_5)]_2$$
$$(C_5H_5)_2Ti[CH_2Al(CH_3)(OCH_4H_9)]_2$$

and other $$(cp)_2Ti[CH_2Al(CH_3)X]_2 \text{ compounds.}$$

The new compounds and compositions of this invention are prepared by reacting together a bis(cyclopentadienyl)titanium (IV) compound with a methyl aluminum compound of kinds such that, on the basis of one mole of the titanium compound and two moles of the aluminum compound, there are supplied six methyl groups and two X groups, i.e. in accordance with the general equation of stoichiometric relationship:

$$(cp)_2TiG_2 + Al(CH_3)_2G + Al(CH_3)_2G$$
$$= (cp)_2Ti[CH_2Al(CH_3)X]_2 + 2CH_4$$

wherein two of the G's are $CH_3$ and the other two of the G's are X, e.g. one of the following stoichiometric proportions:

$$(cp)_2TiX_2 + 2Al(CH_3)_3$$
$$= (cp)_2Ti[CH_2Al(CH_3)X]_2 + 2CH_4$$

$$(cp)_2TiX(CH_3) + Al(CH_3)_3 + Al(CH_3)_2X$$
$$= (cp)_2Ti[CH_2Al(CH_3)X]_2 + 2CH_4$$

$$(cp)_2Ti(CH_3)_2 + 2Al(CH_3)_2X$$
$$= (cp)_2Ti[CH_2Al(CH_3)X]_2 + 2CH_4$$

wherein cp and X are as hereinbefore defined.

Thus, by way of specific example, the new compound $(C_5H_5)_2Ti[CH_2Al(CH_3)Cl]_2$ can be made (a) by reacting bis(cyclopentadienyl)titanium dichloride with trimethylaluminum, or (b) by reacting bis(cyclopentadienyl)methyl titanium chloride with a mixture of trimethylaluminium and dimethylaluminum chloride, or (c) by reacting bis(cyclopentadienyl)dimethyl titanium with dimethylaluminum chloride.

The new compounds of this invention are not merely complexes of a titanium compound with an aluminum compound in the nature of the complexes formed by admixing bis(cyclopentadienyl)titanium dichloride with triethylaluminum or higher trialkylaluminum compounds. Thus, it is believed that a very unstable complex formable from bis(cyclopentadienyl)titanium dichloride and triethylaluminum at low temperatures may have the structure

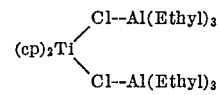

A more stable complex existing at higher temperatures and having a blue color is believed to have the structure

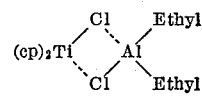

in which it will be seen that the titanium is trivalent.

In contrast to the complexes of the kind just mentioned, the new compounds of this invention are believed to be true compounds having the probable structural formula

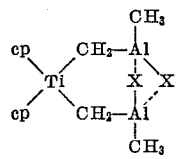

wherein the tetravalent titanium atom is uniquely linked to the aluminum atoms by covalent bonds through methylene (—$CH_2$—) linkages.

The preparation and properties of the new compounds and compositions are illustrated in the following examples which are not to be construed as limiting the invention. In the examples, parts and percentages are by weight unless otherwise indicated.

*Example 1*

One mole of bis(cyclopentadienyl)titanium dichloride partially dissolved in one liter of n-heptane was mixed and reacted with 2.5 moles of trimethylaluminum at a temperature of approximately 90° C. for approximately one hour. Two moles of methane were evolved and a deep red liquid solution resulted. The reaction product was evaporated to dryness and the residue was heated at 95° C. under 3 cm. of mercury pressure in order to expel any unreacted trimethylaluminum or other simple methylaluminum compound by-products. The resulting dark red solid was rinsed with n-heptane and dissolved in xylene. The xylene solution was analyzed and found to be 0.416 M with respect to titanium, 0.804 M with respect to aluminum, and 0.800 M with respect to chloride, or in atomic ratios of Ti:Al:Cl of close to 1:2:2.

*Example 2*

One mole of bis(cyclopentadienyl)titanium dichloride and two moles of trimethylaluminum were mixed without other solvent and reacted at 115° C. for approximately one hour. Two moles of methane were evolved. The resulting product was a dark red powder having analysis as follows:

Calculated for $(C_5H_5)_2Ti[CH_2Al(CH_3)Cl]_2$: Ti, 13.27%; Al, 14.94%; Cl, 19.64%. Found: Ti, 13.6%; Al, 14.5%; Cl, 19.2%.

The slightly higher value of titanium and slightly lower values of aluminum and chloride found relative to the calculated theoretical values are accounted for by the presence in the crude product of a small proportionate amount of titanium-containing impurity.

A sample of the red compound when treated with water evolved four moles of methane gas per atom of titanium in the sample, but evolved no hydrogen. Addition of ferric ammonium sulfate and titration with permanganate indicated the presence of very little if any ferrous iron, showing that very little if any of the titanium in the red compound was trivalent.

A sample of the new red compound was dissolved in benzene and the molecular weight was determined by the isothermal distillation method (cf. C. E. Childs, Anal. Chem., 26, 1963-4 (1954)) and showed a molecular weight of 420±10. Although this value is somewhat higher than the value of about 361 calculated for $$(C_5H_5)_2Ti[CH_2Al(CH_3)Cl]_2$$

the higher value is accounted for by a partial association of the organo-titanium-aluminum compound molecules in benzene. Nevertheless, the molecular weight shows definitely that the new product is a true compound and not merely a physical mixture of starting titanium and aluminum compounds.

Another sample of the new red compound was decomposed with deuterium oxide. As would be expected from the composition $(C_5H_5)_2Ti[CH_2Al(CH_3)Cl]_2$, a mixture of deuterium-substituted methanes was obtained comprising $CH_2D_2$ and $CH_3D$.

*Example 3*

One mole of bis(cyclopentadienyl)titanium dichloride and 2.5 moles of trimethylaluminum were mixed in xylene and held at 115° C. for two hours, two moles of methane being evolved. The nuclear magnetic resonance spectrum of this material was obtained and shows four proton absorption peaks at frequencies and with relative numbers as follows:

| Proton Absorption Peaks | | Probable Source of Protons |
|---|---|---|
| C.p.s. | Number | |
| −70 | 4.6 | Methyl groups on trimethylaluminum. |
| 22 | 4.0 | Methylene groups on new compound. |
| 148 | 6.1 | Methyl groups on new compound. |
| 295 | 12.1 | Cyclopentadienyl rings. |

These data are best accounted for on the basis that the reaction proceeded as follows:

$(C_5H_5)_2TiCl_2 + 2.5\ Al(CH_3)_3 \rightarrow 2CH_4$
$\quad + 0.5\ Al(CH_3)_3 + (C_5H_5)_2Ti[CH_2Al(CH_3)Cl]_2$ and that the analyzed product was a mixture of 0.5 mole trimethylaluminum and one mole of the indicated $$(C_5H_5)_2Ti[CH_2Al(CH_3)Cl]_2$$

new compound. In such a mixture there are protons as follows:

| | Theory | Found |
|---|---|---|
| Protons from 0.5 Al (CH$_3$)$_3$ | 4.5 | 4.6 |
| Protons from two methylene groups in new compound | 4.0 | 4.0 |
| Protons from two methyl groups in new compound | 6.0 | 6.1 |
| Protons from two C$_5$H$_5$-rings in new compound | 10.0 | 12.1 |

In the preparation of the new compound $$(C_5H_5)_2Ti[CH_2Al(CH_3)Cl]_2$$

as described in the foregoing examples, the relative proportions of the trimethylaluminum and the bis(cyclopentadienyl)titanium dichloride starting materials can be varied as desired with either in excess but usually in the range of from one to five moles, preferably from two to three moles, of trimethylaluminum per mole of bis(cyclopentadienyl)titanium dichloride. The reaction may be carried out without a solvent but an inert liquid diluent medium is usually preferred. Suitable solvent-diluents are, for example, aliphatic hydrocarbons such as methane, ethane, propane, butanes, pentanes, hexanes, heptanes, octanes, higher alkanes, cyclohexane, methyl cyclopentane, and methylcyclohexane, aromatic hydrocarbons such as benzene, toluene, xylenes, ethylbenzene, cumene, and cymene, hydroaromatic hydrocarbons such as tetra- and deca-hydronaphthalene, and halogenated hydrocarbons such as dichloromethane, chloroform, carbon tetrachloride, dichlorodifluoromethane, ethylene chloride, perchloroethylene, chlorofluoroethanes, chlorobenzenes, chlorotoluenes, and the like. This reaction is accelerated by heat and is preferably carried out at temperatures from about 100° to about 125° C., not above about 135° C., and is usually practically complete in from about ½ hour to about 2 hours.

The compound $(C_5H_5)_2Ti[CH_2Al(CH_3)Cl]_2$ is a dark brownish red solid and is soluble in most hydrocarbons and chlorohydrocarbons from which it can be recrystallized, e.g. for purification. It reacts with water, which destroys it, forming methane. It also reacts with other active hydrogen compounds such as alcohols, acids, amines, etc. and with oxygen and carbon dioxide.

*Example 4*

Equimolar amounts of bis(cyclopentadienyl) methyltitanium monochloride, dimethylaluminum chloride, and trimethylaluminum were mixed together in xylene solvent and heated to about 115° C. for about two hours. Two moles of methane were evolved. A deep red colored solution resulted from which was obtained the compound $(C_5H_5)_2Ti[CH_2Al(CH_3)Cl]_2$ described in preceding examples.

*Example 5*

One mole of bis(cyclopentadienyl)dimethyltitanium and two moles of dimethylaluminum chloride were admixed in xylene solvent and heated to about 115° C. for about two hours. Two moles of methane were evolved. A deep red colored solution resulted from which was obtained the compound $(C_5H_5)_2Ti[CH_2Al(CH_3)Cl]_2$ described in previous examples.

In place of the particular titanium compounds and aluminum compounds used as starting materials in the above examples, there are used other starting materials in accordance with the general teachings hereinbefore given with substantially the same results.

It is essential that the starting materials be of kinds selected in accordance with the general equation hereinbefore given, i.e.

$(cp)_2TiG_2 + Al(CH_3)_2G + Al(CH_3)_2G$
$\quad = (cp)_2Ti[CH_2Al(CH_3)X]_2 + 2CH_4$ wherein two of the G's are methyl radicals and the other two G's are X radicals, X being halogen or a lower alkoxy radical and (cp) being a cyclopentadienyl or alkyl-substituted cyclopentadienyl radical as hereinbefore defined.

The new compounds $(cp)_2Ti[CH_2Al(CH_3)X]_2$ and the compositions produced by the method of this invention are useful in many ways. Their reactivity adapts them to use as scavengers to remove traces of reactive impurities such as water, alcohol, acids, etc. from otherwise inert liquids or gases. They can, of course, be used as reagents for synthesis of titanium and/or aluminum compounds. They are useful igniters for flammable materials in pyrotechnic articles, fireworks, torches and the like. They are also useful sources of free radicals and activation in polymerization catalysts, drying oil siccative compositions, and the like.

What is claimed is:
1. An organo-titanium-aluminum compound of the class having the general formula

$$(cp)_2Ti[CH_2Al(CH_3)X]_2$$

wherein cp is a cyclopentadienyl moiety selected from the group consisting of cyclopentadienyl and alkylcyclopentadienyl radicals and X is a substituent of the class consisting of halogen and lower alkoxy radicals.

2. The compound having the formula $$(C_5H_5)_2Ti[CH_2Al(CH_3)Cl]_2$$

wherein $C_5H_5$ is the cyclopentadienyl radical.

3. A method of making an organo-titanium-aluminum compound by interacting a bis(cyclopentadienyl)titanium (IV) compound and at least one methylaluminum compound of kinds such that, on the basis of one mole of the titanium compound and two moles of the aluminum compound, there are supplied six methyl groups and two X groups in accordance with the relationship $$(cp)_2TiG_2+Al(CH_3)_2G+Al(CH_3)_2G$$

wherein cp is a cyclopentadienyl moiety selected from the group consisting of cyclopentadienyl and alkylcyclopentadienyl radicals, two of the G's are methyl, the other two G's are X, and X is a substituent of the class consisting of halogen and lower alkoxy radicals, and carrying out the interacting at a reaction temperature not above about 135° C. until about two moles of methane have evolved per mole of starting $(cp)_2TiG_2$ compound.

4. A method of making an organo-titanium-aluminum compound by interacting a bis(cyclopentadienyl)titanium (IV) compound and at least one methylaluminum compound of kinds such that, on the basis of one mole of the titanium compound and two moles of the aluminum compound, there are supplied six methyl groups and two chloride groups in accordance with the relationship $$(C_5H_5)_2TiG_2+Al(CH_3)_2G+Al(CH_3)_2G$$

wherein $C_5H_5$ is the cyclopentadienyl radical, two of the G's are methyl, and the other two G's are chloride, carrying out the interacting at a reaction temperature not above about 135° C. until about two moles of methane have evolved per mole of starting $(C_5H_5)TiG_2$ compound.

5. A method according to claim 4 wherein the interacting is carried out in a reaction mixture comprising an inert liquid diluent medium.

6. A method of making an organo-titanium-aluminum compound by mixing together bis(cyclopentadienyl)titanium dichloride and trimethylaluminum and maintaining the resulting mixture at a reaction temperature not above about 135° C. until about two moles of methane have evolved per mole of reacted bis(cyclopentadienyl)titanium dichloride and there is obtained a dark red colored reaction product.

7. A method of making an organo-titanium-aluminum compound by mixing together bis(cyclopentadienyl)titanium dichloride and from about one to about five moles of trimethylaluminum per mole of the bis(cyclopentadienyl)titanium dichloride and maintaining the resulting mixture at a reaction temperature between about 100° C. and about 125° C. until about two moles of methane have evolved per mole of starting bis(cyclopentadienyl)titanium dichloride and there is obtained a dark red colored reaction product.

8. A method according to claim 7 wherein the mixture of reactants comprises an inert liquid diluent medium.

9. A method of making an organo-titanium-aluminum compound by mixing together bis(cyclopentadienyl)titanium dichloride and from about two to about three moles of trimethylaluminum per mole of the bis(cyclopentadienyl)titanium dichloride in an inert liquid hydrocarbon medium, maintaining the resulting reaction mixture at a reaction temperature between about 100° C. and about 125° C. for from about one-half to about two hours until about two moles of methane have evolved per mole of the starting bis(cyclopentadienyl)titanium dichloride and the reaction mixture is dark red in color.

10. A method according to claim 9 which comprises the further step of evaporating the inert hydrocarbon medium from the resulting reaction mixture at a temperature not above about 135° C. recovering as residue a dark red solid, and recrystallizing the same from an inert liquid solvent.

References Cited by the Examiner

UNITED STATES PATENTS 2,827,446  3/1958  Breslow.
2,952,670  9/1960  Fischer _____ 260—429.5

TOBIAS E. LEVOW, *Primary Examiner.*

ABRAHAM H. WINKELSTEIN, *Examiner.*

W. J. VAN BALEN, H. M. S. SNEED,
*Assistant Examiners.*